Jan. 14, 1964 H. S. FEDER ETAL 3,118,019

TELEPHONE SIGNALING CIRCUIT

Filed Aug. 23, 1960 2 Sheets-Sheet 1

INVENTORS: H. S. FEDER
G. B. THOMAS, JR.
BY
R. C. Winter
ATTORNEY

Jan. 14, 1964 — H. S. FEDER ET AL — 3,118,019

TELEPHONE SIGNALING CIRCUIT

Filed Aug. 23, 1960 — 2 Sheets-Sheet 2

INVENTORS: H. S. FEDER
G. B. THOMAS, JR.
BY R. C. Winter
ATTORNEY

United States Patent Office 3,118,019
Patented Jan. 14, 1964

3,118,019
TELEPHONE SIGNALING CIRCUIT

Herbert S. Feder, Fanwood, and George B. Thomas, Jr., Summit, N.J., assignors to Bell Telephone Laboratories, Incorporated, New York, N.Y., a corporation of New York Filed Aug. 23, 1960, Ser. No. 51,352
14 Claims. (Cl. 179—18)

This invention relates to telephone communication systems and, more particularly, to signaling circuitry for use in communication systems operated in time division multiplex.

Telephone communication systems have long provided equipment for signaling a called party, and for providing an indication to a calling party that the called party is being signaled. In conventional space division systems, each telephone set is provided with a clapper and bell arrangement which is responsive to a ringing signal from the switching center. As is well known in the art, the ringing signal from the switching center may be a low frequency, high voltage alternating-current signal; e.g., a 20 cycle, 90 volt R.M.S. ringing signal. The indication, or ring-back signal, to the calling party is generated at the switching center and applied to the calling line. These signals are transmitted over a distinct transmission path established between the calling and called parties.

With the advent of time division multiplex systems, a transmission path is no longer distinct to an individual conversation, but is shared by a plurality of simultaneous conversations. The multiplex operation is accomplished by sampling each conversation in turn at a high repetition rate and transmitting the samples in sequence over a common transmission path. The conversation samples are then separated in turn and filtered at the receiving terminals to reproduce an accurate fasimile of each of the transmitted conversations. Since the signaling indications to the calling and called parties pass over the common transmission path, they too are sampled on a time division basis. A more complete discussion of time division telephone switching systems may be found in D. B. James et al. Patent 2,957,949, issued October 25, 1960.

The use of solid state devices of limited power-handling capacities in the transmission paths of time division systems has prevented the use in such systems of high voltage ringing signals. One means by which this problem may be circumvented is the provision of specially constructed telephone sets capable of detecting signaling tones from the switching center. The resultant ringing at the telephone set is in the form of an audible tone produced by a tuned transducer at the set responsive to a selected ringing frequency. The ring-back signal to the calling party is produced by a tone generator at the switching center connected to the calling line in a cyclically recurring time interval distinct from the time interval employed for transmitting the ringing signal to the called party. Thus, two distinct repetitive time intervals, or time slots, are utilized for transmitting the ringing and ring-back signals to the respective parties, while only a single repeated time interval is required for the conversation connection. Consequently, the control circuitry for establishing the ringing and ring-back connections is rather complex.

Accordingly, it is an object of our invention to provide an improved time division multiplex signaling arrangement.

It is another object of our invention to reduce the control circuitry required for establishing the various signaling connections in a time division multiplex system.

It is a further object of our invention to reduce the time slot requirements of the signaling circuitry and to utilize more fully the available time slots for conversation connections.

A still further object of our invention is to provide a more economical time division multiplex system by permitting the employment of less complex components.

The above and other objects are attained in a specific illustrative embodiment of the present invention wherein a common transmission link is shared by a number of coincident conversations by dividing a prescribed time interval, or cycle, into a number of sampling intervals called time slots. Each conversation is assigned a particular time slot and is sampled in that time slot during successive cycles of time slots. An exemplary cycle rate in accordance with the highest speech frequency to be transmitted is 12.5 kilocycles. With this cycle rate, conversation is sampled once every 80 microseconds. Assuming 40 time slots available in the cycle, the time interval of each time slot is two microseconds. Each conversation is then sampled repetitively during a distinct two microsecond time slot every 80 microseconds.

In the illustrative embodiment of the invention, both ringing and ring-back are effected in a single reptitive time slot. This is accomplished through the employment of circuitry for connecting the ringing signal to the called line and for connecting the ring-back signal to the calling line or trunk in a particular time slot in respective alternate repetitions of the time slot. Thus the ringing and ring-back signals are interleaved in the particular time slot, thereby permitting the use of a single time slot for both signaling and conversation connections, without additional time slots being required solely for signaling connections. Therefore, assuming the ringing and ring-back signals to be sampled at one-half the exemplary system sampling rate of 12.5 kilocycles, they are each sampled repetitively during a distinct two microsecond time slot every 160 microseconds.

Each subscriber line and each trunk has an individual circuit associated therewith comprising a sampling gate and a filter. Fundamentally, sampling of information in time division systems is limited to a useful bandwidth of one-half the sampling frequency. Accordingly, time division telephone systems have been provided with line and trunk filters each having a cut-off frequency of one-half the sampling frequency to eliminate the sidebands above one-half the sampling frequency.

Ringing and ring-back require individual time slots in such systems, since a line filter having a cut-off frequency equal to one-half the normal sampling frequency will not adequately suppress the lower sidebands produced by the ringing frequency if the ringing signal is sampled at one-half the normal sampling frequency. For example, if a 600 cycle ringing signal is sampled at a 6.25 kilocycle sampling rate, or one-half the normal 12.5 kilocycle sampling rate, the lower sideband will be 5650 cycles. If a line filter having a 6.25 kilocycle cut-off frequency is used, there is no discrimination against the 5650 cycles and the available ringing energy divides between the 600 cycle ringing signal and the 5650 cycle sideband. This results in unsatisfactory ringing performance.

In accordance with one aspect of the present invention, the line filter is provided with a cut-off frequency sufficiently low to suppress the lower sideband produced by sampling the ringing signal at one-half the normal sampling frequency. We have determined that for optimum return loss characteristics and low insertion loss the sum of the cut-off frequencies of the line and trunk filters in a time division connection must equal the sampling frequency; however, as will be considered more fully hereinafter, the cut-off frequencies of the line and trunk filters need not be equal. Therefore, to effect the desired single time slot signaling, the line filter is designed with a cut-off frequency sufficiently low to suppress the lower sideband of the sampled ringing signal, and the trunk filter is designed to complement the line filter such that the sum of their cut-off frequencies is equal to the sampling frequency.

Thus, in accordance with another aspect of the present invention, the ringing signal from the switching center is sampled at one-half the system sampling frequency and is applied to the called subscriber line, during alternate cycles, in the distinct time slot assigned to the call connection. The line filter filters out the ringing sidebands and permits all of the available ringing energy to be applied to the telephone set at the selected ringing frequency. The ring-back signal is also sampled at one-half the system sampling frequency and is applied to the calling line or trunk in the same distinct time slot during the remaining alternate cycles. Audible ring-back tone is thus provided to the calling party to signal that ringing of the called party is being performed.

Accordingly, it is a feature of this invention that a time division telephone system use a single repetitive time slot for both ringing and ring-back indications by providing circuitry for connecting the ringing signal to the called line and coincidentally for connecting the ring-back signal to the calling line or trunk in a particular time slot in respective alternate cycles defined by a plurality of repeated time slots.

It is another feature of this invention that the line and trunk filters in a time divided connection have dissimilar cut-off frequencies, the sum thereof being substantially equal to the sampling frequency.

It is a further feature of this invention that a line filter be provided which has a cut-off frequency determined by the frequency of the ringing signal.

It is a still further feature of this invention that a ringing circuit filter be provided in the ringing circuit which has a cut-off frequency substantially equal to the difference between the line filter cut-off frequency and one-half the system sampling frequency.

These and other objects and features of our invention will be better understood upon consideration of the following detailed description and the accompanying drawing, in which.

Figure 1:
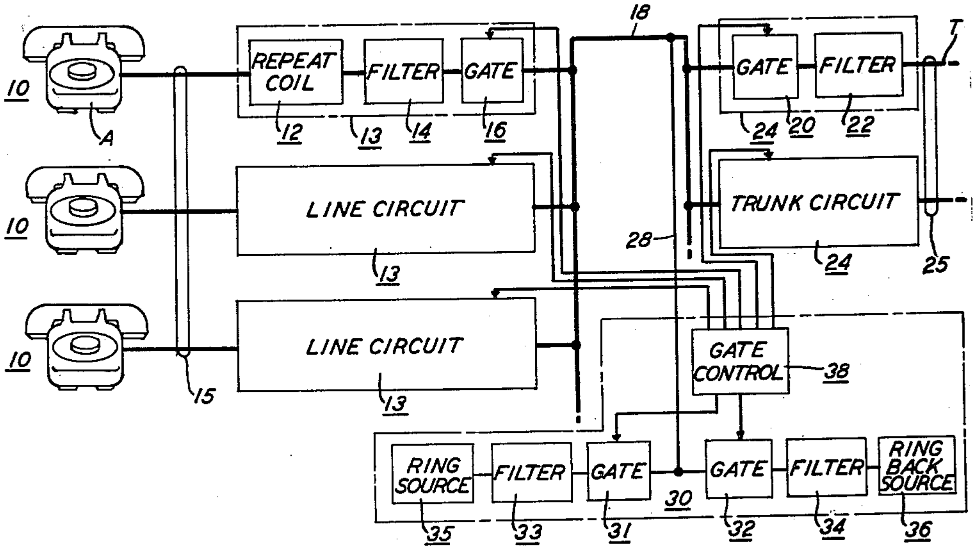
FIG. 1 is a block diagram of an illustrative embodiment in accordance with the principles of our invention.

Referring more particularly to the drawing, FIG. 1 depicts one specific embodiment of a telephone system wherein our invention may be employed advantageously. The illustrative embodiment depicted is a private branch exchange (PBX) wherein a plurality of telephone lines in a community of common interest are connected to a switching center such that they may be interconnected to establish communications with each other. A plurality of trunks are also connected to the switching center to provide communications with other switching centers and the telephone lines connected thereto. Ringing circuitry is provided to signal lines called within the community; and, audible ring-back signaling is provided to signal calling lines within the community and calling trunks from other switching centers.

In the system of FIG. 1 a plurality of telephones 10 are individually connected via telephone lines 15 through line circuits 13 to common transmission link 18. The individual line circuits 13 each comprise repeat coil 12, filter 14, and gate 16. Similarly, individually connected to common transmission link 18 are a plurality of trunks 25, each connected thereto via individual trunk circuits 24 comprising gate 20 and filter 22. Gates 16 and 20 are operated in accordance with signals from gate control 38 to selectively connect individual lines and trunks to common transmission link 18.

The method of operation contemplated in the system in FIG. 1 is time division multiplex wherein each telephone connection is assigned a particular sampling interval, or time slot, in a repeated cycle defined by the time slots. During the assigned time slot, conversation from the active telephone lines is sampled and applied to the common transmission link 18. The conversation samples are transmitted, during the assigned time slot, to a receiving line or trunk where they are filtered to reproduce a facsimile of the original conversation. Thus the cyclical operation of any two line gates 16 in a particular time slot provides a conversation connection between the telephones 10 with which the gates 16 are associated. Similarly, the operation of one line gate 16 and one trunk gate 20 in a particular time slot establishes a conversation connection between the telephone 10 and trunk 25 with which the gates 16 and 20, respectively, are associated. Therefore, common transmission link 18 is shared by a plurality of simultaneous conversations, the connections for which are each established only during a distinct time slot.

In order to signal the called and calling parties when a call connection is being established, suitable circuitry is provided in control center 30 for ringing called parties and for indicating to the calling party that the called party is being signaled. Such circuitry in the embodiment of FIG. 1 includes ring source 35 and ring-back source 36. Ring source 35 is connected through filter 33 and gate 31 via lead 28 to common transmission link 18; and ring-back source 36 is connected to common link 18 through filter 34 and gate 32 via lead 28. Filters 33 and 34 are provided to discriminate against undesirable sideband frequencies. Tone signaling is contemplated in this system, and any of the various forms of tone oscillators known in the art may be employed advantageously in the ring and ring-back sources 35 and 36.

Figure 2:
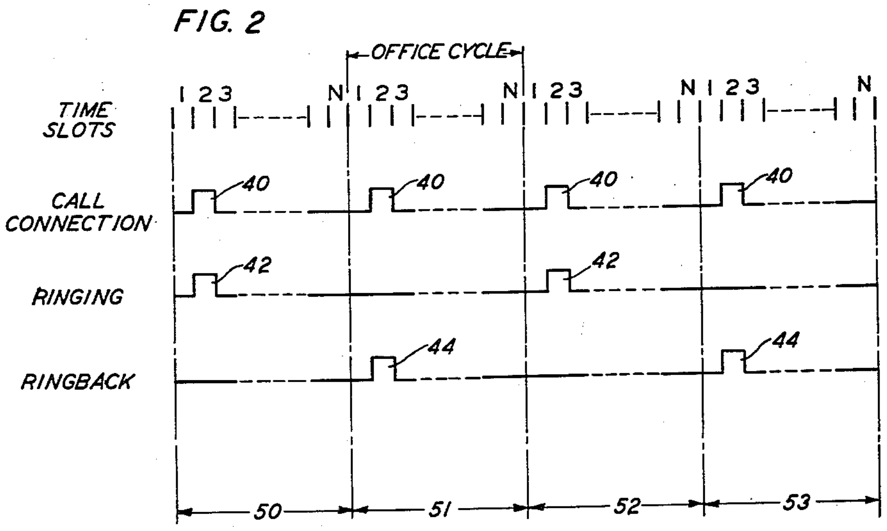
FIG. 2 is a time chart indicating the operation of the embodiment of FIGS. 1 and 3.

Assuming a call coming in on trunk T for telephone A, an available time slot in the office cycle of time slots is assigned to the call; e.g., time slot two. Referring to FIG. 2 of the drawing, time slot two of the office cycle of N time slots is depicted as containing sampling pulse 40. Thus, the conversation between trunk T and telephone A is sampled repetitively by operating the associated gates 16 and 20 during time slot two of every office cycle. Four such office cycles, 50 through 53, are shown in FIG. 2.

Prior to establishing the conversation connection, ring source 35 is connected to telephone A and ring-back source 36 is connected to trunk T via common transmission link 18 to provide ringing and audible ring-back signals to the respective parties. In accordance with the principles of this invention, ringing and ring-back operations are performed in respective alternate office cycles to obviate the necessity for separate time slots for these two operations. The requisite operation is obtained by operating gate 16 associated with telephone A and gate 31 associated with ring source 35 during time slot two in alternate office cycles. This is depicted in FIG. 2 by sampling pulse 42 in office cycles 50 and 52. The absence of pulse 42 from office cycles 51 and 53 indicates the absence of a connection between telephone A and ring source 35 during these office cycles.

Similarly, gates 20 and 32 associated with trunk T and ring-back source 36, respectively, are operated during time slot two in office cycles 51 and 53, as depicted by sampling pulse 44 in FIG. 2. It will be noted, of course, that during the ringing and ring-back functions, gates 16 and 20 are not operated during the same office cycle.

Thus the ringing signal is restricted to the called party's side of the call connection, and the calling party is isolated from the called party until the call connection has been completed.

Figure 3:
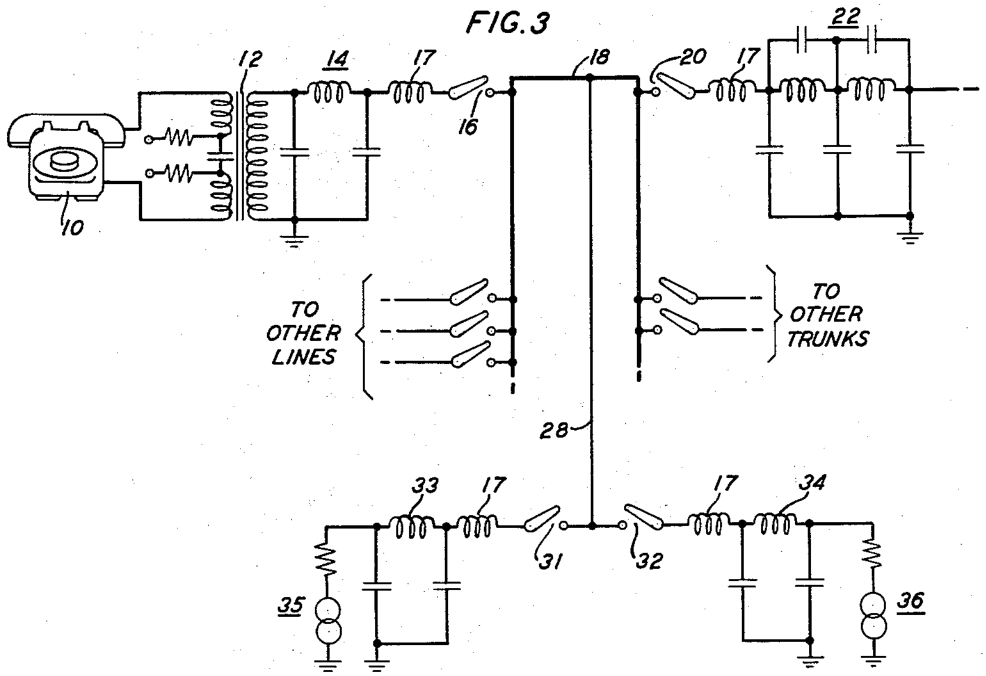
FIG. 3 illustrates schematically a portion of the embodiment of FIG. 1.

In FIG. 3 the embodiment of FIG. 1 is shown in greater detail and similar parts are referred to by like reference characters. Sampling gates 16, 20, 31, and 32 are depicted in their ideal forms as a perfect switch which satisfies the requirements in this system of alternate zero and infinite impedance to current flow. Each gate is activated selectively to allow passage of signals therethrough during a particular time slot by the application of pulses from a control circuit, indicated as gate control 38 in FIG. 1 but not shown specifically in FIG. 2. Satisfactory gating circuitry for this purpose is known in the art and, for example, may take the form of the gates shown in H. S. Feder patent application Serial No. 769,251, filed October 23, 1958. Advantageously, inductance 17 is provided to permit low loss transfer of signals through the gate in accordance with the resonant transfer circuit disclosed in W. D. Lewis Patent 2,936,337, issued May 10, 1960.

Low-pass filters 14, 22, 33, and 34 comprise well-known low-pass filter elements and are designed to produce the individual cut-off characteristics required. As mentioned hereinabove, for optimum return loss characteristics the sum of the cut-off frequencies of the line and trunk filters in a time division connection must equal the sampling frequency; however, the cut-off frequencies of the line and trunk filters need not be equal.

Figure 4A:
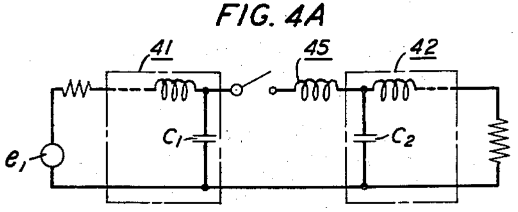
FIG. 4A is a simplified block diagram of a time division connection.
Figure 4B:
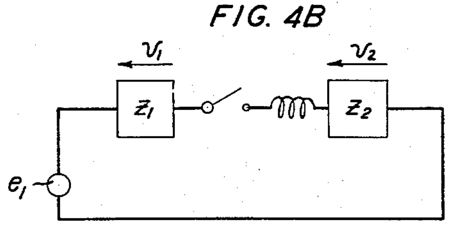
FIG. 4B depicts the equivalent circuit of the gate loop of FIG. 4A.

In FIG. 4A a simplified block diagram of a time division connection is illustrated as comprising two filters, 41 and 42, which may be interconnected through resonant transfer gate 45. The equivalent circuit of FIG. 4A with respect to the resonant transfer gate is depicted in FIG. 4B, where $Z_1$ and $Z_2$ represent the impedances presented to the gate by filters 41 and 42. The gate 45 is closed periodically at particular multiples of time as shown by the relationship:

$$t=kT \tag{1}$$

where $t$ is the instant of time when the gate is closed, $k$ is an integer and T is a fixed period of time which may be defined as a cycle. The gate remains closed for a period of time $\tau$ which is small compared with T.

Therefore, assuming resonant transfer with gate closures of very short duration, the magnitude of the current impulse at the instant of gate closure may be expressed by the relationship:

$$I=\frac{2C_1C_2}{C_1+C_2}[e_1(kT)-v_1(0)-v_2(0)] \tag{2}$$

where $v_1(0)$ and $v_2(0)$ represent the initial values of $v_1$ and $v_2$ due to previous impulses.

In order to eliminate the dependence of a given impulse on previous impulses and to provide dependence of the given impulse only on $e_1(k\text{T})$, prior time division systems have employed filters designed to make $v_1(0)$ and $v_2(0)$ equal to zero at successive gating instants. Such line and trunk filters having identical cut-off frequencies equal to $\pi/T$, one-half the system sampling rate, whose gate loop impedances vary with frequency in the manner shown in FIG. 6 will produce the impulse response:

$$v_1=v_2=e_1(kT)\frac{\sin\frac{\pi}{T}(t-kT)}{\frac{\pi}{T}(t-kT)} \tag{3}$$

Figure 5:
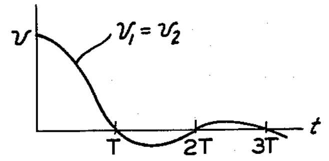
FIG. 5 is a plot of the voltage response of a specific filter structure in a time division connection.

This function is plotted in FIG. 5 and is seen to be zero at all successive gating instants, as required.

However, the embodiment of FIGS, 1 and 2 contemplates half-rate sampling of the ringing and ring-back signals. As discussed hereinbefore, a line filter having a cut-off frequency equal to one-half the system sampling frequency will not adequately suppress the lower sidebands produced by the ringing frequency if the ringing signal is sampled at one-half the system sampling frequency.

Figure 6:
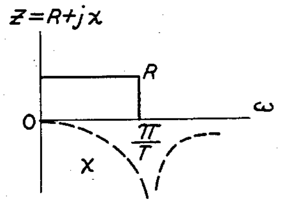
FIG. 6 is an impedance plot of a specific filter structure in a time division connection.

Reference to Equation 2 above, however, indicates that a given impulse will depend solely on $e_1(k\text{T})$, not only when $v_1(0)$ and $v_2(0)$ each equal zero, but also when the sum of $v_1(0)$ and $v_2(0)$ equals zero. This amounts to requiring that the residual voltages from previous impulses be equal and opposite so that their effects cancel. Accordingly, if the line and trunk filter impedances are as shown in FIG. 6, but with dissimilar cut-off frequencies of $$\frac{\pi}{T_1}$$

and $$\frac{\pi}{T_2}$$

respectively, the sum of $v_1$ and $v_2$ when $k$ equals zero is expressed by the relationship:

$$v_1+v_2=\frac{2IR}{\pi}\frac{\sin\frac{\pi t}{T_1}+\sin\frac{\pi t}{T_2}}{t} \tag{4}$$

$$=\frac{4IR}{\pi}\frac{\sin\left(\frac{T_1+T_2}{2T_1T_2}\right)\pi t\cos\left(\frac{T_1-T_2}{2T_1T_2}\right)\pi t}{t} \tag{5}$$

This sum of $v_1$ and $v_2$ is equal to zero when $$t=n\left(\frac{2T_1T_2}{T_1+T_2}\right) \tag{6}$$

where $n$ is an integer. Therefore, substitution of this quantity into Equation 1 above yields the relationship:

$$\frac{1}{T_1}+\frac{1}{T_2}=\frac{2}{T} \tag{7}$$

which, multiplied by $\pi$ yields:

$$\frac{\pi}{T_1}+\frac{\pi}{T_2}=\frac{2\pi}{T} \tag{8}$$

where $2\pi/T$ is the system sampling rate. Thus, in accordance with our invention, line filter 14 is designed to have a cut-off frequency sufficiently low to suppress the ringing signal sidebands, and trunk filter 22 is designed to have a cut-off frequency such that the sum of the two cut-off frequencies is equal to the sampling rate of the system.

In the illustrative system having a sampling rate of 12.5 kilocycles and a ringing tone of 600 cycles, line filter 14 according to our invention was provided with a cut-off frequency of 4 kilocycles and required three elements. Trunk filter 22 was provided with a cut-off frequency of 8.5 kilocycles and required seven elements. Both filters were designed to present 2000 ohms impedance as seen from common transmission link 18, and to exhibit a substantially constant resistance over the range of frequencies to be transmitted.

In a similar system employing line and trunk filters having like cut-off frequencies of 6.25 kilocycles, each filter required five elements. Considering the substantially greater number of line filters than trunk filters utilized in time division telephone systems, it is readily seen that a considerable reduction may be effected in the number of filter elements required in the system by employing line and trunk filters having dissimilar cut-off frequencies. For example, the illustrative system according to our invention using 40 trunk filters and 200 line filters requires 320 less filter elements than a similar system having line and trunk filters of like cut-off frequency.

For purposes of ringing, ring source 35 is connected to line circuit 13 of the called party at a 6.25 kilocycle sampling rate. To satisfy the criterion that the sum of the cut-off frequencies of the filters in the connection must equal the sampling rate for optimum return loss, filter 33 is provided with a cut-off frequency of 2.25 kilocycles, thus obtaining good transmission of the ringing tones. Fidelity and efficiency of transmission are of lesser importance in the ring-back signaling connection, and in this specific application it was found that a cut-off frequency of 4 kilocycles for filter 34 provides satisfactory ring-back performance.

Although the above discussion has considered only call connections between a trunk and a line, it is apparent that line-to-line call connections are contemplated and may be made readily within the system. The line-to-line time division connection includes two line filters 14, and the corresponding gates 16 are operated at the full system sampling rate. The fact that the sum of the cut-off frequencies of the two line filters is not equal to the sampling rate results in a decrease in return loss and a slight increase in transmission loss. However, return loss is of little or no consequence in line-to-line call connections, and the increase in transmission loss is so slight that the resulting changes in transmission characteristics are not important. Similarly, changes in transmission characteristics would occur when making a trunk-to-trunk connection. However, trunk-to-trunk connections are not contemplated in the type of telephone system depicted in FIGS. 1 and 3.

It may be appreciated that in a system having a large number of telephone lines connected to a common communication link on a time division basis, a considerable saving in components is realized by utilizing the principles taught in this invention. The traffic handling capacity of the switching unit is increased because fewer time slots are needed to handle ringing and ring-back. The use of single time slot signaling permits less complicated programs for the control center. In addition, the use of filters having dissimilar cut-off frequencies reduces the number of filter elements required in the system.

It is to be understood that the above-described arrangements are merely illustrative of the application of the principles of the invention. Numerous other arrangements may be devised by those skilled in the art without departing from the spirit and scope of the invention.

What is claimed is:

1. A communication system comprising a plurality of lines, a plurality of trunks, a common transmission path, gating means for connecting a selected one of said lines and a selected one of said trunks to said path, means for enabling said gating means to sample said selected line and trunk during a distinct time slot in a repetitive cycle of time slots, means for applying ringing tone to said path in said distinct time slot, a filter in each of said lines having a cut-off frequency determined by the frequency of the ringing tone, and a filter in each of said trunks having a cut-off frequency distinct from said line filter cut-off frequency, the sum of said line and trunk filter cut-off frequencies being substantially equal to the sampling frequency.

2. A communication system in accordance with claim 1 wherein said means for applying ringing tone to said path comprises a source of ringing tone, other gating means for connecting the source of ringing tone to said path, and means for enabling said other gating means during said distinct time slot in alternate cycles of said repetitive cycle of time slots.

3. A communication system in accordance with claim 2 wherein said means for applying ringing tone to said path further comprises a filter having a cut-off frequency substantially equal to the difference between said line filter cut-off frequency and one-half said sampling frequency.

4. A communication system in accordance with claim 3 further comprising means for applying ring-back tone to said path during said distinct time slot in alternate cycles of said repetitive cycle of time slots.

5. In a communication system, a first line comprising first filter means having a cut-off frequency $f_c$, a second line comprising second filter means having a cut-off frequency $f_t$ distinct from $f_c$, means for connecting said first line to said second line in a particular time slot recurring cyclically at a frequency substantially equal to $f_c+f_t$, first signaling means, second signaling means, and means for connecting said first signaling means to said first line and for connecting said second signaling means to said second line during said particular time slot in respective alternate cycles.

6. In a time division telephone system, the combination for providing ringing and ring-back signaling to a transmission line in a single time slot comprising ringing signal means, ring-back signal means, first gating means for connecting said ringing signal means to said transmission line during a particular time slot in alternate repeated cycles $C_a$ defined by the time slots and recurring at a predetermined frequency, second gating means for connecting said ring-back signal means to said transmission line in said particular time slot in alternate repeated cycles $C_b$ distinct from $C_a$, means for connecting said transmission line to a called telephone line during said particular time slot in said alternate repeated cycles $C_a$, and means for connecting said transmission line to a calling trunk in said particular time slot in said alternate repeated cycles $C_b$.

7. The combination defined in claim 6 wherein said calling trunk comprises first filter means having a first cut-off frequency and wherein said called telephone line comprises second filter means having a second cut-off frequency, the sum of said first and second cut-off frequencies being substantially equal to said predetermined frequency of the cycles of said time slots.

8. The combination defined in claim 7 wherein said cut-off frequency of said second filter is lower than the lower sideband of the signal from said ringing signal means.

9. In a communication system, a line comprising filter means, a trunk comprising filter means with a cut-off frequency distinct from the cut-off frequency of said line filter means, means for connecting said line to said trunk in a distinct time slot of a cycle of time slots recurring at a frequency equivalent to the sum of the cut-off frequencies of said line and trunk filter means, and means for signaling said line and said trunk in said distinct time slot.

10. In a communication system, a tone signaling circuit comprising a first tone source, a first transmission path, means for connecting said first tone source to said first transmission path during a distinct time interval in first alternate repetitions of said time interval recurring at a predetermined frequency, a second tone source, a second transmission path comprising filter means having a first cut-off frequency determined by the frequency of said second tone source, means for connecting said second tone source to said second transmission path during said distinct time interval in second alternate repetitions of said time interval, said connecting means comprising filter means having a second cut-off frequency, the sum of said first and second cut-off frequencies being equal to one-half said predetermined frequency, and means for connecting said first transmission path to said second transmission path during said distinct time interval.

11. A communication system in accordance with claim 10 wherein said first transmission path comprises filter means having a cut-off frequency equal to the difference between first cut-off frequency and said predetermined frequency.

12. A communication system in accordance with claim 10 wherein said first cut-off frequency is lower than the frequency difference between the frequency of said second tone source and said predetermined frequency.

13. In a telephone system, a plurality of subscriber lines each comprising first filter means having a cut-off frequency $f_c$, a trunk comprising second filter means having a cut-off frequency $f_t$ distinct from $f_c$, means for connecting a called one of said lines to said trunk in a particular time slot of a repeated cycle defined by said time slots and recurring at a frequency substantially equal to $f_c+f_t$, a ring source, a ring-back source, means for connecting said ring source to said called line, and means for connecting said ring-back source to said trunk in said particular time slot in respective alternate cycles of said repeated cycle.

14. A telephone system in accordance with claim 13 wherein said means for connecting said ring source to said called line comprises filter means having a cut-off frequency $$\frac{f_t-f_c}{2}$$

References Cited in the file of this patent

UNITED STATES PATENTS

| | | |
|---|---|---|
| 2,934,606 | Trousdale | Apr. 26, 1960 |
| 2,953,749 | Beesley | Sept. 20, 1960 |
| 2,986,602 | Tubinis | May 30, 1961 |